(No Model.)
B. F. RADFORD.
FRICTION CLUTCH.
No. 483,941. Patented Oct. 4, 1892.
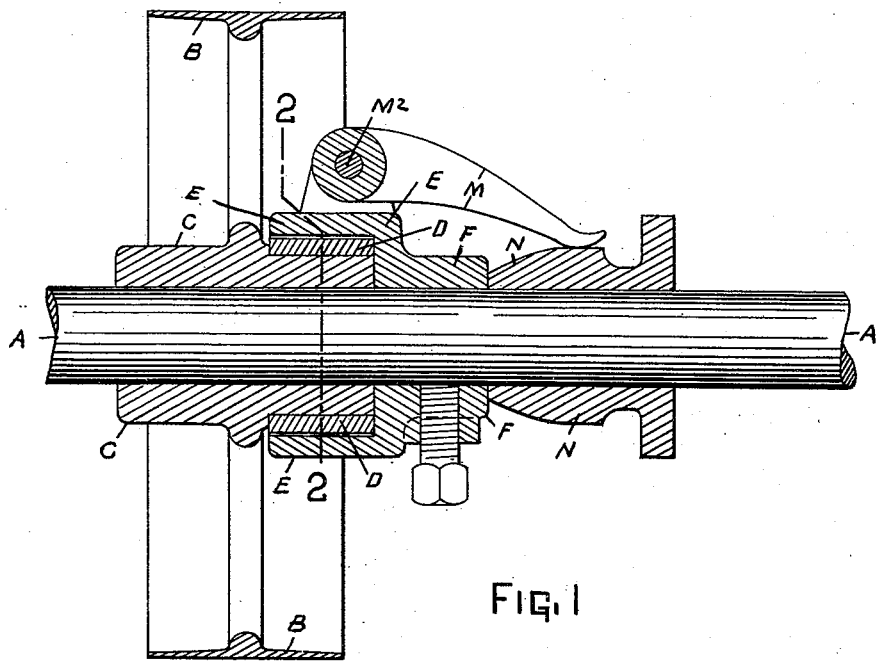
Fig. 1
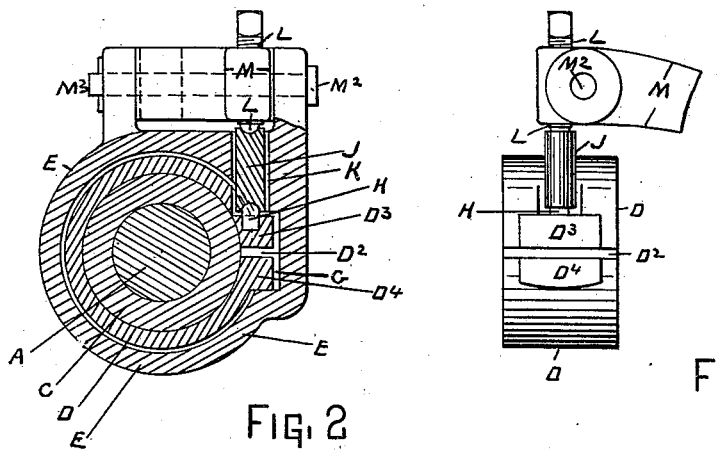
Fig. 2
Fig. 3
WITNESSES
Marion E. Brown.
Francis M. Brown.
INVENTOR
Benjamin F. Radford
by his attorneys
Brown Brothers

UNITED STATES PATENT OFFICE.

BENJAMIN F. RADFORD, OF HYDE PARK, MASSACHUSETTS.

FRICTION-CLUTCH.

SPECIFICATION forming part of Letters Patent No. 483,941, dated October 4, 1892.

Application filed June 15, 1891. Serial No. 396,374. (No model.)

*To all whom it may concern:*

Be it known that I, BENJAMIN F. RADFORD, a citizen of the United States of America, and a resident of the town of Hyde Park, in the county of Norfolk and State of Massachusetts, have invented certain new and useful Improvements in Friction-Clutches, of which the following is a full, clear, and exact description.

This invention relates to a friction-clutch for a pulley loose on a shaft; and the clutch of this invention is composed of parts combined and arranged and working together, all as hereinafter described, and pointed out in the claim.

In the drawings forming part of this specification, Figure 1 is a side view of a shaft and a central longitudinal vertical section of the pulley and of the clutching mechanism of this invention. Fig. 2 is a transverse vertical section on line 2 2, Fig. 1. Fig. 3 is a view in detail, as hereinafter appears.

In the drawings, A is the shaft, and B is a pulley having a hub C and arranged to turn loosely on shaft A.

D is a ring having a split $D^2$ at one side along a radial line and preferably otherwise, so as to have at said split a greater or lesser degree of movement as it is closed and opened. $D^3$ $D^4$ are two outwardly and circumferentially projected ear-pieces, one at each side of said split of the ring D and directly opposite to each other. The split ring surrounds more or less closely the hub C of the pulley B, and it, together with its ear-pieces, is surrounded by a collar E, having a hub extension F, rigidly fixed by set screw or screws to the shaft.

The collar F interiorly has a recess G to receive the ear-pieces $D^3$ $D^4$ of the split ring. This recess at one side makes a rest and bearing for the outer face of the ear-piece $D^4$.

H is a pin held on the ear-piece $D^4$ of the split ring D and projected therefrom in a direction tangential to the ring. This pin H at its outer end is rounded off and seats in a correspondingly-shaped cavity at the inner end of a cylindrical block J, loosely fitting a bore K of the collar E, that is axially tangential to the collar. The outer end of the block J has a rounded concavity, making a bearing or seat for a correspondingly-rounded end of a projection L, located at the outer edge of and held on an edgewise vertically-arranged lever M, that at one end is fulcrumed on a horizontal pin $M^2$, supported on the collar E, and at the other end is free and in position to rest on a cone-shaped slide-collar N of the shaft A.

The slide of the collar N toward the pulley works the lever M in a direction to force the block J inward, and thus through the pin H of the split ring said ring is first forced around the hub of the pulley, and, having become seated by its ear-piece $D^4$ on the fixed collar F of the shaft, it is then closed about and upon said pulley-hub, and so the pulley is clutched to the shaft.

The slide of the collar N away from the pulley frees the split ring D of pressure, and so leaves it to return to its normal position, unclutching the pulley from the shaft.

The movement of the block J is in a fixed rectilinear and tangential direction relative to a circle described from the axis of the shaft, whereas the split ring in moving to close upon and to open from the pulley-hub passes in the first instance from a position that is eccentric to to a position that is concentric with the axis of said hub, and in the second instance from a position that is concentric with to a position that is eccentric to the axis of said hub, and all because of the pin H, held on and interposed between said split ring and seated at its outer and free end on the inner end of said block, in a manner, securing in all positions of the split ring the presentation of the pin for direct and positive action either of the block J on the split ring when said ring is being closed on or of the split ring on the block J, when said ring is opening from the pulley-hub. The function of the pin H in the connection just explained plainly is most important for perfect operation of the parts to clutch and unclutch the pulley.

Having thus described my invention, what I claim, and desire to secure by Letters Patent, is—

The combination, with a shaft and a pulley loose on said shaft, of a ring D at one side, radially split and normally loose on the hub of the pulley and at its split having radial projected and opposed ear-pieces $D^3 D^4$, a pin H, held on and tangentially projected from said ear-piece $D^3$, a collar E, loosely surrounding said ring and at its inner side having a recess G, receiving said ear-pieces D³ D⁴ and making a seat for the ear-piece D⁴, and also having a hub extension F fixed on the shaft, a block J loose in and tangential to said collar and at its inner end seated on the outer and free end of said pin H of the ear-piece D³ of said split ring D, a lever M, fulcrumed on said collar and at one side of its fulcrum having bearing on the outer end of said block J, and a cone-shaped slide N of the shaft, having said lever M bearing thereon at the opposite side of the fulcrum to its bearing on the block J, substantially as described, for the purposes specified.

In testimony whereof I have hereunto set my hand in the presence of two subscribing witnesses.

BENJ. F. RADFORD.

Witnesses:
 ALBERT W. BROWN,
 MARION E. BROWN.